United States Patent [19]
Glanzbergh

[11] Patent Number: 5,920,370
[45] Date of Patent: Jul. 6, 1999

[54] ADJUSTABLE CLIP-ON OPTICAL ELEMENT DEVICE

[76] Inventor: Mitchel Glanzbergh, 1103 La Gunatas Ct., Aptos, Calif. 95003

[21] Appl. No.: 09/004,232

[22] Filed: Jan. 8, 1998

[51] Int. Cl.$^6$ ........................................... G02C 9/00
[52] U.S. Cl. .............................. 351/47; 351/57; 351/128
[58] Field of Search ................... 351/41, 47, 57, 351/83, 86, 154, 124, 125, 126, 128

[56] References Cited

U.S. PATENT DOCUMENTS

| | | | |
|---|---|---|---|
| 4,842,399 | 6/1989 | Tsai | 351/106 |
| 5,123,724 | 6/1992 | Salk | 351/47 |
| 5,724,118 | 3/1998 | Krebs | 351/47 |

*Primary Examiner*—Huy Mai
*Attorney, Agent, or Firm*—Thomas I. Rozsa; Tony D. Chen; Jerry Fong

[57] ABSTRACT

A clip-on optical element device to be clipped on in front of lenses of a pair of eyeglasses or like and conforming to the pair of eyeglasses. The clip-on optical element device comprises a pair of opposite optical elements, a pair of opposite adjustable, flexible, bendable, and shapeable open rims for receiving the pair of optical elements, and a flexible bridge member detachably connecting the pair of flexible open rims together in a spaced apart relationship. The clip-on optical element device further comprises two pairs of upper and lower clips respectively attached to each of the pair of open rims for securing the clip-on device to the pair of eyeglasses. Each optical element has an annular slot in its peripheral surface and a perimeter which substantially conforms with each of the lenses of the pair of eyeglasses. Each open rim has a protruding ridge in its inner periphery surface for receiving and engaging with the annular slot of the optical element. The optical element is retained thereto by a nylon cord which engages with the annular slot and attached between the ends of the open rim.

10 Claims, 4 Drawing Sheets

ADJUSTABLE CLIP-ON OPTICAL ELEMENT DEVICE

BACKGROUND OF THE INVENTION

1. Field of the Invention

The present invention generally relates to the field of attachments for eyeglasses. More particularly, the present invention relates to the field of clip-on optical element attachments to be clipped on in front of the lenses of eyeglasses or like.

2. Description of the Prior Art

Generally, prior art clip-on eyeglass devices are well known in the art. These clip-on eyeglass devices have not been entirely satisfactory for several reasons. For example, eyeglasses are made in a variety of sizes and a variety of configurations. The configuration of eyeglasses tends to vary from time to time because of changes in fashion or for other reasons. Many prior art clip-on devices are mass produced in one size and shape. Specifically, the optical elements of such devices often do not have the same configuration and spacing as the lenses of eyeglasses with which they are used. Undersized optical elements and optical elements that are out of register with the eyeglass lenses tend to disrupt the wearer's field of view and also present an unaesthetic appearance to others. Oversized optical elements may contact the wearer's skin in an irritating manner and have projecting edges that may promote dislodgement of the accessory from the eyeglasses.

To avoid these problems, some manufacturers of eyeglass frames provide clip-on sunglass devices having optical elements that conform with the lenses and lens spacings of a particular frame. Prior art conforming clip-on devices are largely limited to use with specific frame configuration for which the device was designed or at best are suitable for use with a limited number of frames that have closely similar configurations. Dispensing opticians typically offer a variety of different frame styles and stocking of a corresponding large inventory of different clip-on devices is costly and inefficient.

The following two (2) prior art patents are found to be pertinent to the field of the present invention:

1. U.S. Pat. No. 4,842,399 issued to Tsai on Jun. 27, 1989 for "Apparatus And Method For Retaining A Spectacle Lens On A Rimless Spectacle Frame With A Tough Cord" (hereafter the "Tsai Patent"); and 2. U.S. Pat. No. 5,123,724 issued to Salk on Jun. 23, 1992 for "Customized Clip-On Eyeglass Accessory And Method Of Manufacture" (hereafter the "Salk Patent").

The Tsai Patent discloses an apparatus and method for retaining a spectacle lens on a rimless spectacle frame with a tough cord. It comprises a rimless frame, a spectacle lens, and a tough cord. The frame has an inverted U-shaped portion formed in its inward surface with an open-ended lens receiving slot for engaging with the upper peripheral portion of the lens. Each end of the inverted U-shaped portion has a counterbore formed therethrough. The cord extends through two counterbores in the inverted U-shaped portion and is integrally formed with two enlarged end portions which are confined within the large-diameter outer end portion counterbores respectively. One of the interengaging surfaces between the lens and the cord has a slot so that they can be engaged with each other, thereby retaining the lens on the frame with cord.

The Salk Patent discloses a customized clip-on eyeglass accessory and method of manufacture. An outline of the lens regions of a particular pair of eyeglasses is prepared and two initially oversized optical elements are trimmed to conform with the outline. Upper and lower eyeglass engaging clasps are secured to each optical element and ends of a resilient bridge member are inserted into passages in each upper clasp. At least one upper clasp and the optical element to which it is fastened is slidable along the bridge member to space the elements apart at a distance corresponding to the spacing of the eyeglass lens regions. The upper clasps are then secured to the bridge member and end portions of the bridge member that protrude from the upper clasps are then cut off.

It is desirable to provide a very efficient and also very effective design and construction of an improved clip-on optical element device which can conform to any size and shape of a particular eyeglass frame configuration. It is also desirable to provide an improved clip-on optical element device with the capability of rapidly changing the frame configuration to meet the need of a particular frame configuration.

SUMMARY OF THE INVENTION

The present invention is a unique clip-on optical element device to be clipped on in front of lenses of a pair of eyeglasses and conforming to the pair of eyeglasses. The clip-on optical element device can be used as sunglasses or vision lenses or both The clip-on optical element device comprises a pair of opposite optical elements, a pair of opposite flexible, bendable, and shapeable open rims for receiving the pair of optical elements, and a flexible bridge member detachably connecting the pair of flexible open rims together in a spaced apart relationship. The clip-on device further comprises two pairs of upper and lower clips which are respectively attached to each of the pair of open rims for securing the clip-on device to the pair of eyeglasses.

Each optical element has an annular slot in its outer peripheral surface and a perimeter which substantially conforms with each of the lenses of the pair of eyeglasses. Each open rim has a protruding ridge in its inner periphery surface for partially receiving and engaging with the annular slot of the optical element. The optical element is further retained thereto by a nylon cord which also engages with the annular slot that is not engaged with the protruding ridge. The nylon cord is attached and secured between the ends of the open rim.

It is an object of the present invention to provide a clip-on optical element device which conforms with any particular eyeglasses.

It is an additional object of the present invention to provide a clip-on optical element device which is adjustable so that it can conform to any particular eyeglasses.

It is a further object of the present invention to provide a clip-on optical element device which comprises a pair of open rims which are flexible, bendable, and shapeable to many different shapes, so that they can conform to any particular shape and size of the optical elements.

In the preferred embodiment of the present invention, the first and second open rims are adjustably connected to the bridge member, where the open portions of the first and second open rims face inwardly.

In an alternative embodiment of the present invention, the first and second open rims are adjustably connected to the bridge member, where the open portions of the first and second open rims face outwardly.

In another alternative embodiment of the present invention, the first and second open rims are permanently fixed to the bridge member, where the open portions of the first and second open rims face inwardly.

In a further alternative embodiment of the present invention, the first and second open rims are permanently fixed to the bridge member, where the open portions of the first and second open rims face outwardly.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
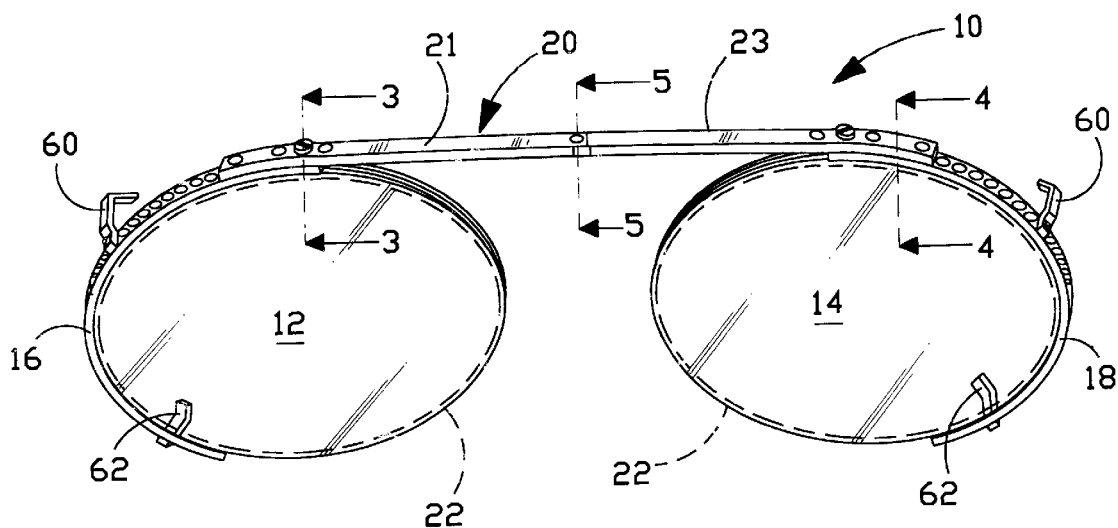
FIG. 1 is a perspective view of the preferred embodiment of the present invention clip-on optical element device.

Referring to FIG. 1, there is shown at 10 a preferred embodiment of the present invention clip-on optical element device to be clipped on in front of lenses of a pair of eyeglasses (not shown). The clip-on optical element device 10 comprises a first optical element 12, a second optical element 14, a first adjustable open rim 16, a second adjustable open rim 18, and an elongated resilient bridge member 20. The first 12 and second 14 optical elements are of the light reducing type, such as magnifiers or other types of optical lenses and are trimmed to have perimeters that conform substantially with the lenses of the pair of eyeglasses. Each optical element has an annular slot 22 in its outer peripheral surface.

Figure 2:
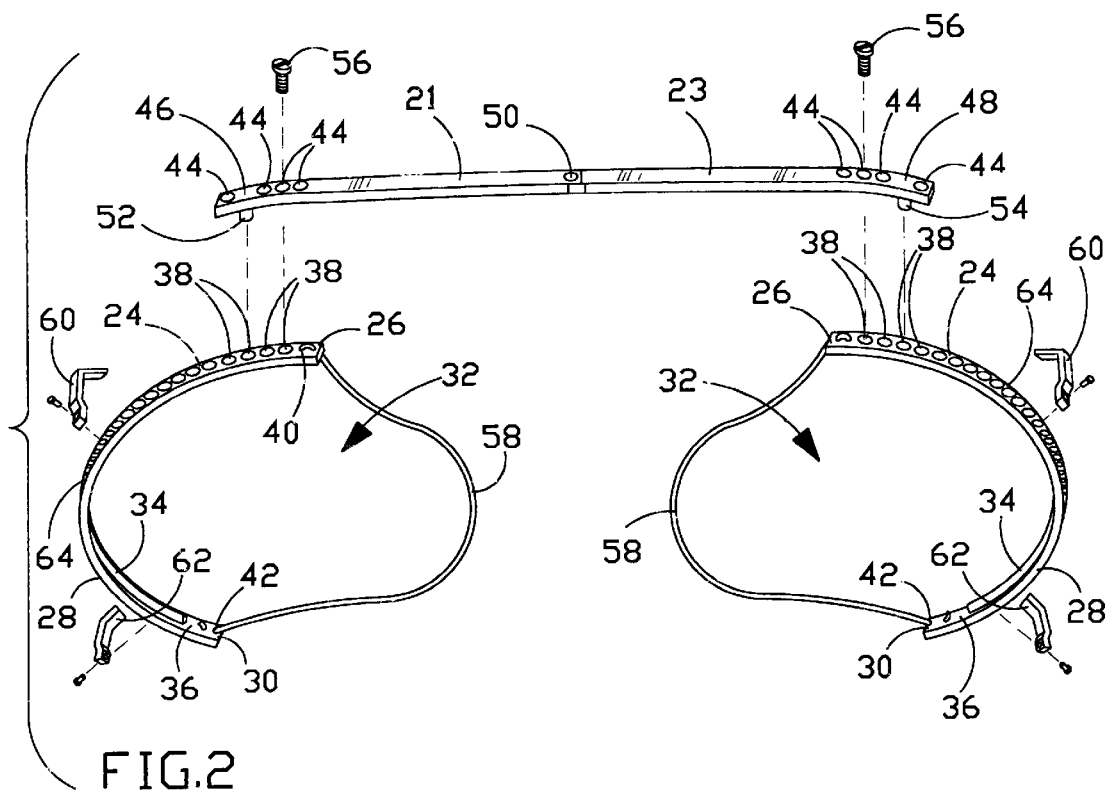
FIG. 2 is an exploded perspective view of the clip-on optical element device shown in FIG. 1.

Referring to FIGS. 1 and 2, the open rims 16 and 18 are flexible, bendable, and shapeable to many different shapes. Since, the first adjustable open rim 16 is an exact mirror-image of the second adjustable open rim 18, only the first adjustable open rim 16 will be described below, unless otherwise explicitly indicated. The open rim 16 comprises a proximal portion 24 with a proximal end 26, a distal portion 28 with a distal end 30, an open portion 32 facing inwardly, and a protruding ridge 34 located in its inner periphery surface 36 for receiving and engaging with the annular slot 22 of the first optical element 12. The open rim 16 further comprises a plurality of spaced apart threaded apertures 38 therethrough located on the periphery. A first pair of adjacent retaining bores 40 and a second pair of adjacent retaining bores 42 are further provided and located adjacent to the proximal end 26 and the distal end 30 respectively. The protruding ridge 34 begins on the proximal portion 24 near the outermost threaded aperture 38 and extends through the distal portion 28 at the other end of the outermost threaded aperture 38.

Figure 5:
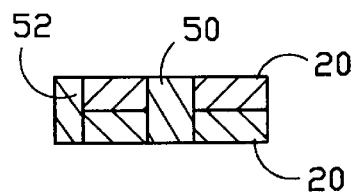
FIG. 5 is an enlarged cross-sectional view taken along line 5—5 of FIG. 1.
Figure 6:
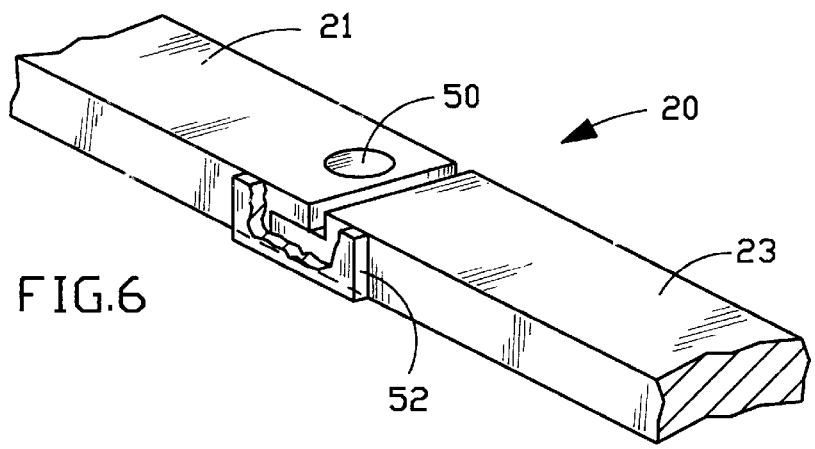
FIG. 6 is an enlarged partial perspective view of the flexible bridge member showing the pivotably hinged joint.

Referring to FIGS. 2, 5 and 6, the elongated resilient bridge member 20 comprises a first half section 21 and a second half section 23 hingeably connected to the first half section 21 by a pivotably hinged joint 50 for folding the resilient bridge member 20 in half. Each half section comprises a plurality of spaced apart apertures 44 located on the free ends 46 and 48. The pivotably hinged joint 50 functions in conjunction with a stop flange 52 which is affixed to a middle of the resilient bridge member 20 adjacent hinged joint 50 for preventing the resilient bridge member 20 from folding in the wrong direction.

Figure 3:
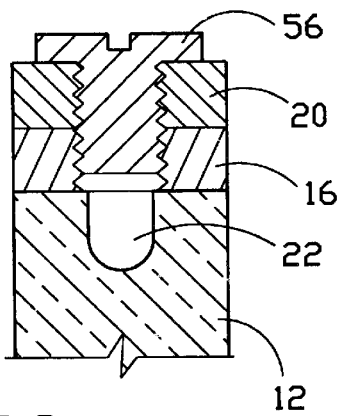
FIG. 3 is an enlarged cross-sectional view taken along line 3—3 of FIG. 1.
Figure 4:
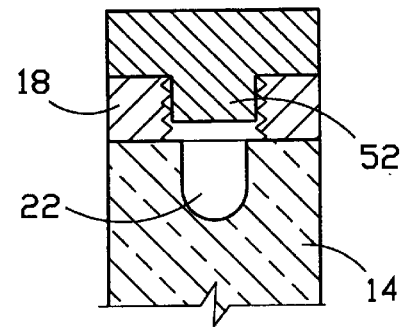
FIG. 4 is an enlarged cross-sectional view taken along line 4—4 of FIG. 1.

Referring to FIGS. 2, 3 and 4, a pair of anchor pins 52 and 54 are respectively connected at opposite ends 46 and 48 of the bridge member 20, and extend downwardly therefrom for being respectively inserting into one of the plurality of threaded apertures 38 of the first and second open rims 16 and 18. A screw means 56 is respectively inserted into one of the plurality of apertures 44 at the opposite ends 46, 48 of the flexible bridge member 20 and threadedly engaged with the respective one of the plurality of threaded apertures 38 of the first and second open rims 16 and 18 for securing the first and second open rims 16 and 18 to the flexible bridge member 20.

A nylon cord 58 is installed to the open rim 16 by inserting one end of the cord 58 into the first pair of bores 40 located on the proximal portion 24 of the open rim 16 and the other end of the cord 58 is inserted into the second pair of bores 42 located on the distal portion 28 of the open rim 16 and engaged with the annular slot 22 of the first optical element 12 for securing the first optical element to the open rim 16.

Figure 7:
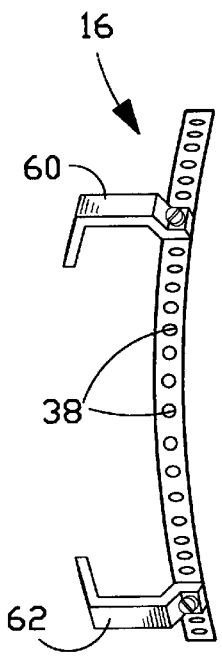
FIG. 7 is an enlarged perspective of one of the flexible, bendable, and shapeable open rims.

Referring to FIG. 7, the clip-on device 10 further comprises an upper eyeglass securing fastener 60 and a lower eyeglass securing fastener 62 which are detachably connected to an outer periphery surface 64 of the first 16 and second 18 adjustable open rims for engaging with the pair of eyeglasses and securing the clip-on device 10 to the pair of eyeglasses. The lower and upper eyeglass securing fasteners 60 and 62 further comprise a plastic covering (not shown) for preventing scratching of the pair of eyeglasses.

Figure 8:
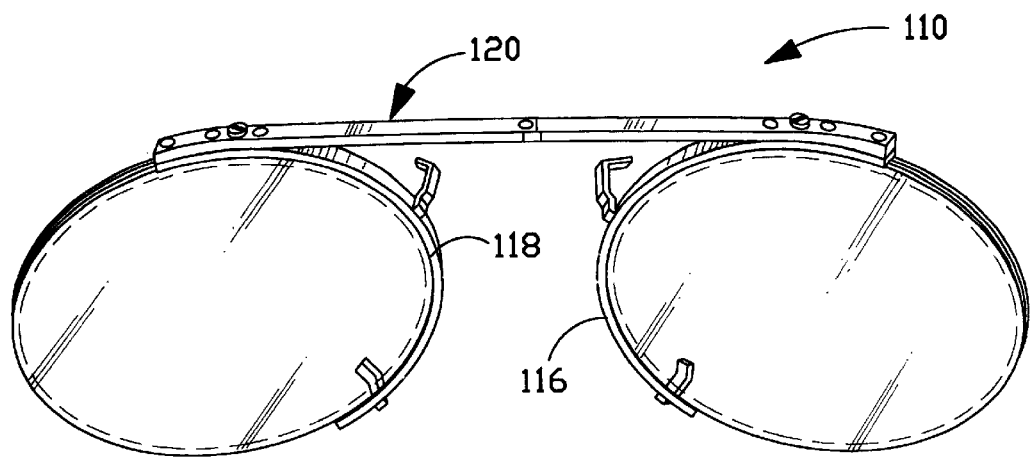
FIG. 8 is a perspective view an alternative embodiment of the present invention clip-on optical element device.

Referring to FIG. 8, there is shown an alternative embodiment of the present invention clip-on optical element device 110 which is similar to the preceding embodiment, and the description thereof will not be repeated. Since it assembles and functions the same as previously described above except that the left adjustable, flexible, bendable, and shapeable open rim 116 is now moved to the right side of the clip-on optical element device 110 and the right adjustable, flexible, bendable, and shapeable open rim 118 is now moved to the left side of the clip-on optical element device 110, the parts are numbered correspondingly with 100 added to each number. In addition, the adjustable open rims 116 and 118 may or may not have a plurality of spaced apart apertures 38 shown in FIGS. 1, 2, and 7. In this embodiment, FIG. 8 does not depict the plurality of apertures 38. The flexible bridge member 120 is detachably connected to the adjustable open rims 116 and 118 as previously described.

Figure 9:
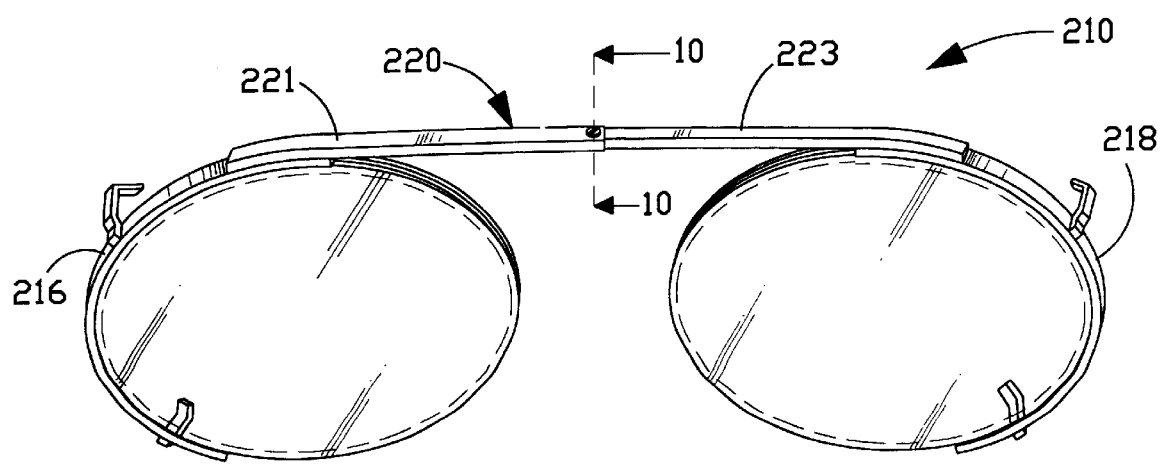
FIG. 9 is a perspective view of another alternative embodiment of the present invention clip-on optical element device.

Referring to FIG. 9, there is shown another alternative embodiment of the present invention clip-on optical element device 210 which is similar to the preferred embodiment except that the resilient bridge member 220 is fixedly attached to the adjustable open rims 216 and 218, the parts are numbered correspondingly with 200 added to each number.

Figure 11:
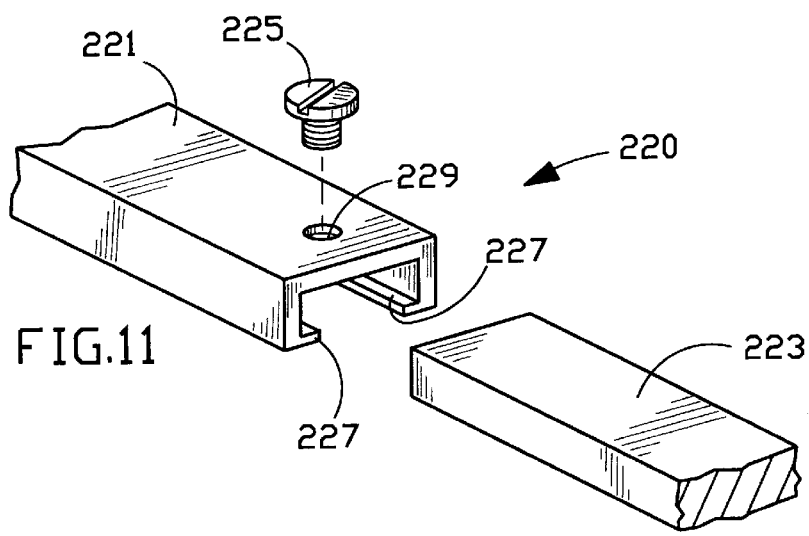
FIG. 11 is an enlarged partial perspective view of the telescoping flexible bridge member shown in FIG. 9.
Figure 10:
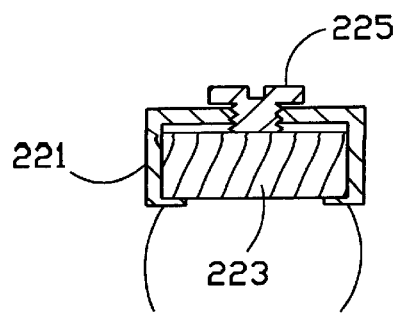
FIG. 10 is an enlarged cross-sectional view taken along line 10—10 of FIG. 9.

Referring to FIGS. 10 and 11, in this embodiment, the flexible bridge member 220 comprises a first hollow half section 221 and a second half section 223 which is telescopically connected to the first half section 221 by a threaded screw 225 which is threaded into a threaded aperture 229 provided on the first half section 221 and thereby engages with the second half section 223 to secure the second half section 223 thereto. The first half section 221 comprises two opposite ledges 227 for retaining the second half section 223 within the first half section 221. By telescopically connecting the first and second half sections 221 and 223 together, the width of the clip-on optical element device 210 can easily be adjusted to a particular person.

Figure 12:
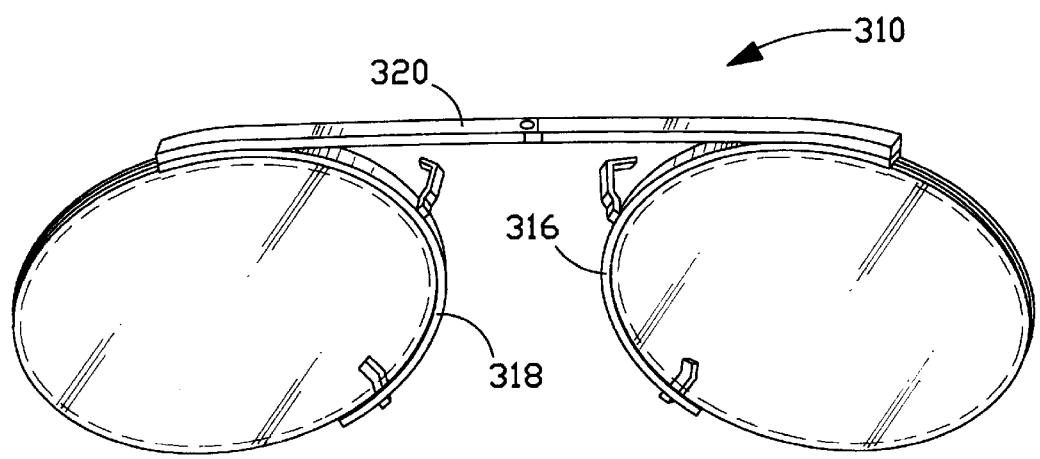
FIG. 12 is a perspective view of a further alternative embodiment of the present invention clip-on optical element device.

Referring to FIG. 12, there is shown a further alternative embodiment of the present invention clip-on optical element device 310 which is similar to the preceding embodiment shown in FIG. 8, except that the first adjustable open rim 316 is now fixedly attached to the right side the flexible bridge member 320 of the clip-on optical element device 310 and the second adjustable open rim 318 is now fixedly attached to the left side of the flexible bridge member 320 of the clip-on optical element device 310, the parts are numbered correspondingly with 300 added to each number. In addition, the flexible bridge member 320 may be a telescopic type bridge member or a folding type bridge member as described in the preceding embodiments.

Defined in detail, the present invention is a clip-on device to be clipped on in front of lenses of a pair of eyeglasses, the clip-on device comprising: (a) a first optical element and a second optical element each having an annular slot in its outer peripheral surface and a perimeter that respectively conforms substantially with each of the lenses of the pair of eyeglasses; (b) a first adjustable, flexible, bendable, and shapeable open rim having a proximal portion with a proximal end, a distal portion with a distal end, an open portion facing inwardly, and a protruding ridge in its inner periphery surface for receiving and engaging with the annular slot of the first optical element, the proximal portion having a plurality of spaced apart threaded apertures therethrough and a first pair of adjacent retaining bores located adjacent to the proximal end, the distal portion having a second pair of adjacent retaining bores located adjacent to the distal end; (c) a second adjustable, flexible, bendable, and shapeable open rim having a proximal portion with a proximal end, a distal portion with a distal end, an open portion facing inwardly, and a protruding ridge in its inner periphery surface for receiving and engaging with the annular slot of the second optical element, the proximal portion having a plurality of spaced apart threaded apertures therethrough and a first pair of adjacent retaining bores located adjacent to the proximal end, the distal portion having a second pair of adjacent retaining bores located adjacent to the distal end; (d) an elongated resilient bridge member having a first half section and a second half section pivotably connected to the first half section for allowing the resilient bridge member to fold in half, each half member having a plurality of spaced apart apertures located at opposite ends; (e) a pair of opposite anchor pins respectively connected to the opposite ends of the bridge member and extending downwardly therefrom for being respectively inserted into a respective one of the plurality of threaded apertures of the first and second open rims; (f) a screw means respectively inserted into one of the plurality of apertures at the opposite ends of the flexible bridge member and threadedly engaged with the respective one of the plurality of threaded apertures of the first and second open rims for securing the first and second open rims to the flexible bridge member; (g) a first cord means engaged with the annular slot of the first optical element and secured to the proximal and distal ends of the first open rim to retain the first optical element thereto; (h) a second cord means engaged with the annular slot of the second optical element and secured to the proximal and distal ends of the second open rim to retain the second optical element thereto; (i) a first lower eyeglass securing fastener detachably connected to an outer periphery surface of the first adjustable and flexible open rim, and a second lower eyeglass securing fastener detachably connected to an outer periphery surface of the second adjustable and flexible open rim; and j) a first upper eyeglass securing fastener detachably connected to the outer periphery surface of the first adjustable and flexible open rim, and a second upper eyeglass securing fastener detachably connected to the outer periphery surface of the second adjustable and flexible open rim.

Defined broadly, the present invention is a clip-on device to be clipped on in front of lenses of a pair of eyeglasses, the clip-on device comprising: (a) a pair of optical elements each having a channel in its peripheral surface and a perimeter that respectively conforms substantially with each of the lenses of the pair of eyeglasses; (b) a pair of adjustable, flexible, bendable, and shapeable open rims each having a proximal portion with a proximal end, a distal portion with a distal end, an open portion, and a protruding ridge in its inner periphery surface for respectively receiving and engaging with the channel of a respective one of the pair of optical elements and retained thereto by two cords, a respective one of which is attached between the proximal and distal ends and also engaging with the channel of the respective one of the pair of optical elements, each proximal portion having at least one threaded aperture; (c) a resilient bridge member having at least one aperture on opposite end portions and at least one anchor pin at the opposite end portions and extending downwardly therefrom; (d) the proximal portion of each of the pair of flexible open rims aligned with and adjustably connected to a respective one of the opposite end portions of the resilient bridge member, and secured thereto by a respective screw means inserted into the at least one aperture on the respective one of the opposite end portions of the bridge member and threadedly engaged with a respective one of at least one threaded aperture on the respective one of the pair of flexible open rims; and (e) two pairs of upper and lower clips with a respective pair attached to the respective one of the pair of open rims for securing the clip-on device to the pair of eyeglasses.

Defined more broadly, the present invention is a clip-on device to be clipped on in front of lenses of a pair of eyeglasses, the clip-on device comprising: (a) a pair of optical elements each having an engaging means in its peripheral surface and a perimeter that respectively conforms substantially with each of the lenses of the pair of eyeglasses; (b) a pair of open rims each having at least one threaded aperture and a corresponding receiving means in its periphery surface for respectively receiving and engaging with the engaging means of each of the pair of optical elements and retained thereto by a cord which is attached between ends of the pair of open rims and with one cord per open rim, with a respective cord also engaging with the engaging means of a respective one of the pair of optical elements; (c) a bridge member having at least one aperture on opposite end portions; (d) the pair of open rims aligned with and adjustably connected to the bridge member at opposite end portions, and secured thereto by a screw means inserted into the at least one aperture on each of the opposite end portions of the bridge member and threadedly engaged with the at least one threaded aperture of each of the pair of open rims; and (e) means for securing the clip-on device to the pair of eyeglasses.

Defined also in detail, the present invention is a clip-on device to be clipped on in front of lenses of a pair of eyeglasses, the clip-on device comprising: (a) a pair of optical elements each having a channel in its peripheral surface and a perimeter that respectively conforms substantially with each of the lenses of the pair of eyeglasses; (b) a pair of adjustable, flexible, bendable, and shapeable open rims each having a proximal portion with a proximal end, a distal portion with a distal end, an open portion, and a protruding ridge in its inner periphery surface for respectively receiving and engaging with the channel of a respective one of the pair of optical elements and retained thereto by two cords, a respective one of which is attached between the proximal and distal ends and also engaging with the channel of the respective one of the pair of optical elements; (c) a resilient bridge member having opposite end portions; (d) the proximal portion of each of the pair of flexible open rims affixed to a respective one of the opposite end portions of the resilient bridge member; and (e) two pairs of upper and lower clips with a respective pair attached to a respective one of the pair of open rims for securing the clip-on device to the pair of eyeglasses.

Defined also broadly, the present invention is a clip-on device to be clipped on in front of lenses of a pair of eyeglasses, the clip-on device comprising: (a) a pair of optical elements each having an engaging means in its peripheral surface and a perimeter that respectively conforms substantially with each of the lenses of the pair of eyeglasses; (b) a pair of open rims each having a corresponding receiving means in its periphery surface for respectively receiving and engaging with the engaging means of each of the pair of optical elements and retained thereto by a cord which is attached between ends of the pair of open rims and with one cord per open rim, with a respective cord also engaging with the engaging means of a respective one of the pair of optical elements; (c) a bridge member having end portions, where the pair of open rims are respectively affixed to the end portions; and (d) means for securing the clip-on device to the pair of eyeglasses.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A clip-on device to be clipped on in front of lenses of a pair of eyeglasses, the clip-on device comprising:

a. a first optical element and a second optical element each having an annular slot in its outer peripheral surface and a perimeter that respectively conforms substantially with each of said lenses of said pair of eyeglasses;

b. a first adjustable, flexible, bendable, and shapeable open rim having a proximal portion with a proximal end, a distal portion with a distal end, an open portion facing inwardly, and a protruding ridge in its inner periphery surface for receiving and engaging with said annular slot of said first optical element, the proximal portion having a plurality of spaced apart threaded apertures therethrough and a first pair of adjacent retaining bores located adjacent to the proximal end, the distal portion having a second pair of adjacent retaining bores located adjacent to the distal end;

c. a second adjustable, flexible, bendable, and shapeable open rim having a proximal portion with a proximal end, a distal portion with a distal end, an open portion facing inwardly, and a protruding ridge in its inner periphery surface for receiving and engaging with said annular slot of said second optical element, the proximal portion having a plurality of spaced apart threaded apertures therethrough and a first pair of adjacent retaining bores located adjacent to the proximal end, the distal portion having a second pair of adjacent retaining bores located adjacent to the distal end;

d. an elongated resilient bridge member having a first half section and a second half section pivotably connected to the first half section for allowing the resilient bridge member to fold in half, each half section having a plurality of spaced apart apertures located at opposite ends;

e. a pair of opposite anchor pins respectively connected to said opposite ends of said bridge member and extending downwardly therefrom for being respectively inserted into a respective one of said plurality of threaded apertures of said first and second open rims;

f. a screw means respectively inserted into one of said plurality of apertures at said opposite ends of said flexible bridge member and threadedly engaged with said respective one of said plurality of threaded apertures of said first and second open rims for securing said first and second open rims to said flexible bridge member;

g. a first cord means engaged with said annular slot of said first optical element and secured to said proximal and distal ends of said first open rim to retain said first optical element thereto;

h. a second cord means engaged with said annular slot of said second optical element and secured to said proximal and distal ends of said second open rim to retain said second optical element thereto;

i. a first lower eyeglass securing fastener detachably connected to an outer periphery surface of said first adjustable and flexible open rim, and a second lower eyeglass securing fastener detachably connected to an outer periphery surface of said second adjustable and flexible open rim; and j. a first upper eyeglass securing fastener detachably connected to said outer periphery surface of said first adjustable and flexible open rim, and a second upper eyeglass securing fastener detachably connected to said outer periphery surface of said second adjustable and flexible open rim.

2. The clip-on device in accordance with claim 1 wherein said two lower and upper eyeglass securing fasteners further comprise a plastic covering for preventing scratching of said pair of eyeglasses.

3. The clip-on device in accordance with claim 1 further comprising a stop flange attached to said resilient bridge member and adjacent to ends of said first and second half sections for allowing said first and second half sections to fold in one direction.

4. A clip-on device to be clipped on in front of lenses of a pair of eyeglasses, the clip-on device comprising:

a. a pair of optical elements each having a channel in its peripheral surface and a perimeter that respectively conforms substantially with each of said lenses of said pair of eyeglasses;

b. a pair of adjustable, flexible, bendable, and shapeable open rims each having a proximal portion with a proximal end, a distal portion with a distal end, an open portion, and a protruding ridge in its inner periphery surface for respectively receiving and engaging with said channel of a respective one of said pair of optical elements and retained thereto by two cords, a respective one of which is attached between the proximal and distal ends and also engaging with said channel of the respective one of said pair of optical elements, each proximal portion having at least one threaded aperture;

c. a resilient bridge member having at least one aperture on opposite end portions and at least one anchor pin at the opposite end portions and extending downwardly therefrom;

d. said proximal portion of each of said pair of flexible open rims aligned with and adjustably connected to a respective one of said opposite end portions of said resilient bridge member, and secured thereto by a respective screw means inserted into said at least one aperture on the respective one of said opposite end portions of said bridge member and threadedly engaged with a respective one of at least one threaded aperture on the respective one of said pair of flexible open rims; and e. two pairs of upper and lower clips with a respective pair attached to the respective one of said pair of open rims for securing said clip-on device to said pair of eyeglasses.

5. The clip-on device in accordance with claim 4 wherein said bridge member further comprises a first half section and a second half section hingeably connected to the first half section by a pivotably hinged joint for folding said bridge member in half.

6. The clip-on device in accordance with claim 5 further comprising a stop flange attached to said bridge member for folding said first and second half sections in one direction.

7. The clip-on device in accordance with claim 5 wherein said second half section of said bridge member telescopically connected and secured to the first half section by a threaded screw.

8. The clip-on device in accordance with claim 4 further comprising a cover for covering each of said two pairs of upper and lower clips to prevent said two pairs of upper and lower clips from damaging said lenses of said pair of eyeglasses.

9. The clip-on device in accordance with claim 4 wherein said open portion of each of said pair of flexible open rims are facing inwardly toward each other.

10. The clip-on device in accordance with claim 4 wherein said open portion of each of said pair of flexible open rims are facing outwardly away from each other.

* * * * *